United States Patent [19]

Wickman et al.

[11] Patent Number: 6,038,221
[45] Date of Patent: Mar. 14, 2000

[54] DEVICE AT TELECOMMUNICATIONS SYSTEMS USING A PATTERN OF TIME SLOTS

[75] Inventors: Johan Wickman, Bjarred; Peter Olanders, Lomma, both of Sweden

[73] Assignee: Telia AB, Farsta, Sweden

[21] Appl. No.: 08/776,600

[22] PCT Filed: Jul. 11, 1995

[86] PCT No.: PCT/SE95/00845

§ 371 Date: Apr. 1, 1997

§ 102(e) Date: Apr. 1, 1997

[87] PCT Pub. No.: WO96/07278

PCT Pub. Date: Mar. 7, 1996

[30] Foreign Application Priority Data

Aug. 19, 1994 [SE] Sweden .................................. 9402764

[51] Int. Cl.[7] ...................................................... H04J 3/00
[52] U.S. Cl. .......................... 370/280; 370/282; 370/285; 370/315; 370/527; 455/7; 455/426
[58] Field of Search .................................... 370/277, 278, 370/279, 280, 281, 282, 285, 315, 316, 317, 318, 438, 439, 527; 455/426, 450, 517, 524, 7, 15

[56] References Cited

U.S. PATENT DOCUMENTS

| | | | |
|---|---|---|---|
| 4,780,620 | 10/1988 | Höberg et al. | 370/438 |
| 5,229,995 | 7/1993 | Strawczynski et al. | 370/280 |
| 5,590,396 | 12/1996 | Henry | 455/426 |
| 5,822,310 | 10/1998 | Chennakeshu et al. | 370/318 |

FOREIGN PATENT DOCUMENTS

| | | |
|---|---|---|
| 500620 | 7/1994 | Sweden . |
| 9210889 | 6/1992 | WIPO . |
| 9321719 | 10/1993 | WIPO . |
| 9414250 | 6/1994 | WIPO . |

*Primary Examiner*—Douglas W. Olms
*Assistant Examiner*—Shick Hom
*Attorney, Agent, or Firm*—Oblon, Spivak, McClelland, Maier & Neustadt, P.C.

[57] ABSTRACT

A radio based access network type Digital European Cordless Telecommunication DECT in which powerful and simply-built up network components, such as repeaters are an integral part. The device makes possible a signaling which makes digital decoding and adding a special capacity to the system unnecessary.

15 Claims, 2 Drawing Sheets

DEVICE AT TELECOMMUNICATIONS SYSTEMS USING A PATTERN OF TIME SLOTS

BACKGROUND OF THE INVENTION

1. Field of the Invention

The present invention is intended to be used at telecommunication systems, for instance radio based access networks in which powerful and simply constructed network components, preferably repeaters, are included.

2. Discussion of the Background

The present invention shows how signalling can be superimposed on existent DECT Digital European Cordless Telecommunications-signalling. The invention can also be used on other systems with similar access method as DECT.

DECT uses TDMA/TDDD/MC, i.e. Time Division Multiple Access/Time Division Duplex/MultiCarrier, which is schematically shown in FIG. 1, which illustrates the division and use in time and frequency in DECT. Along the x-axis is shown a frame consisting of 12+12 time slots for down and uplink respectively, and along the y-axis is shown the 10 carrier channels, i.e. the division in frequency. In DECT these slots may be utilized very freely; because DECT is intended to be selfplanning etc there are no real obstructions for using all the slots in a frame for, for instance a down link.

TDD in classification in up and down link on the "same" carrier and MC in the using of more than one carrier. The TDMA-structure can be said to be in the division in time slots for up and down link.

The technical problem consists of the fact that there for some services are needs for sending short messages within a DECT-system without needing to allocate a special time slot for this and without the need to allocate more frequency space.

With a DECT-system is in this connection referred to Fixed Parts (FP; an FP can consist of a CFP, Central Fixed Part and one or more remote fixed part RFP. RFP and or FP can be described as "base stations" in DECT), Repeaters (sometimes called FR; Fixed Repeaters) and Portable Parts (PP). With short messages is referred to a short string of characters intended for for instance identification (of base stations repeaters or other radio based network elements) etc, or special messages of for instance broadcast type. Some of the equipment which can receive or transmit these messages shall be simple, and is not intended to contain any digital signal processing of the contents in separate time slots (typical examples of this are repeaters).

SUMMARY OF THE INVENTION

By the invention can be built up arrangements with powerful and simple network components, which shall be able to signal without digital decoding. For instance radio based access networks with repeaters using TDMA/TDD/MC are appropriate for implementation of the invention. The amount of information which can be transferred with the invention is very large, which implies that even a more general communication will be possible. By the invention is signalling between network components without mentioned digital decoding or adding separate capacity made possible. The new procedure of sigalling is not previously known. Repeaters can be arranged in a functional and simple way, which gives the mentioned system a very big economic and functional potential. The invention can be used for present systems using mentioned TDMA/TDD/MC. By the invention are solved important problems related to system signalling to respective from repeaters in TDMA/TDD/MC-system without the communication being negatively influenced.

BRIEF DESRIPTION OF THE DRAWINGS

One at present suggested embodiment of a device which presents the significant features of the invention is described in the following at the same time referring to the enclosed drawings, where;

FIG. 1 schematically shows the time and frequency division in DECT,

DISCUSSION OF THE PREFERRED EMBODIMENT

Figure 1:
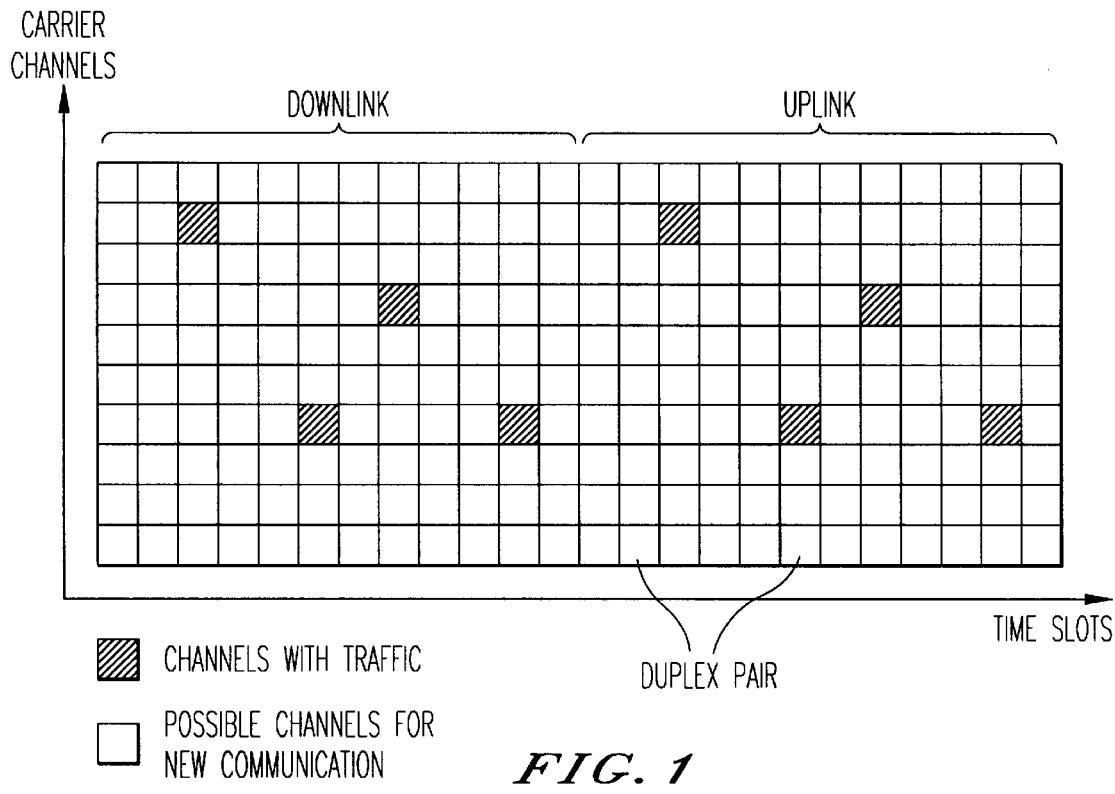
Figure 2:
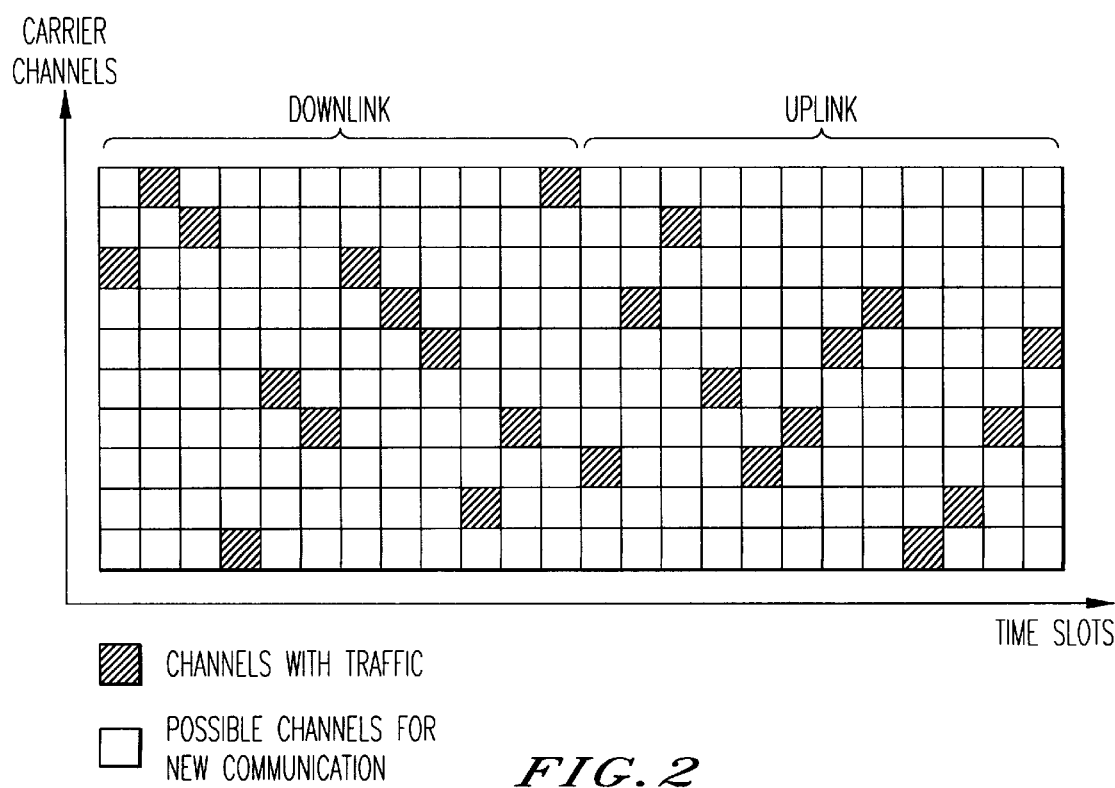
FIG. 2 shows a graphic description of the superimposed signalling.

The pattern representing the TDMA/TDD/MC-signalling can as such be used for superimposed signalling. In the case of DEC this allows for a simple case $10^{12}$ different possibilities (messages which by that become maximally as long) if only up or down links are used, $10^{24}$ if both are used. How this signalling is performed is shown in FIG. 2.

In each time slot there are 10 different possibilities (carrier channels), within a frame (a frame consists of 12 time slots for uplink, and 12 time slots for downlink) can then be achieved totally $10^{12}$ (if only either uplinks or downlinks is used) or $10^{24}$ (if both uplinks and downlinks are used).

The contents in a time slot can be speech or data, but the contents can of course also be "empty", i.e. the slot is sent, but there are no useful information in the slot itself. With this arrangement the capacity of the system is not lowered at all, no changes within the time slots are needed, etc.

Figure 3:
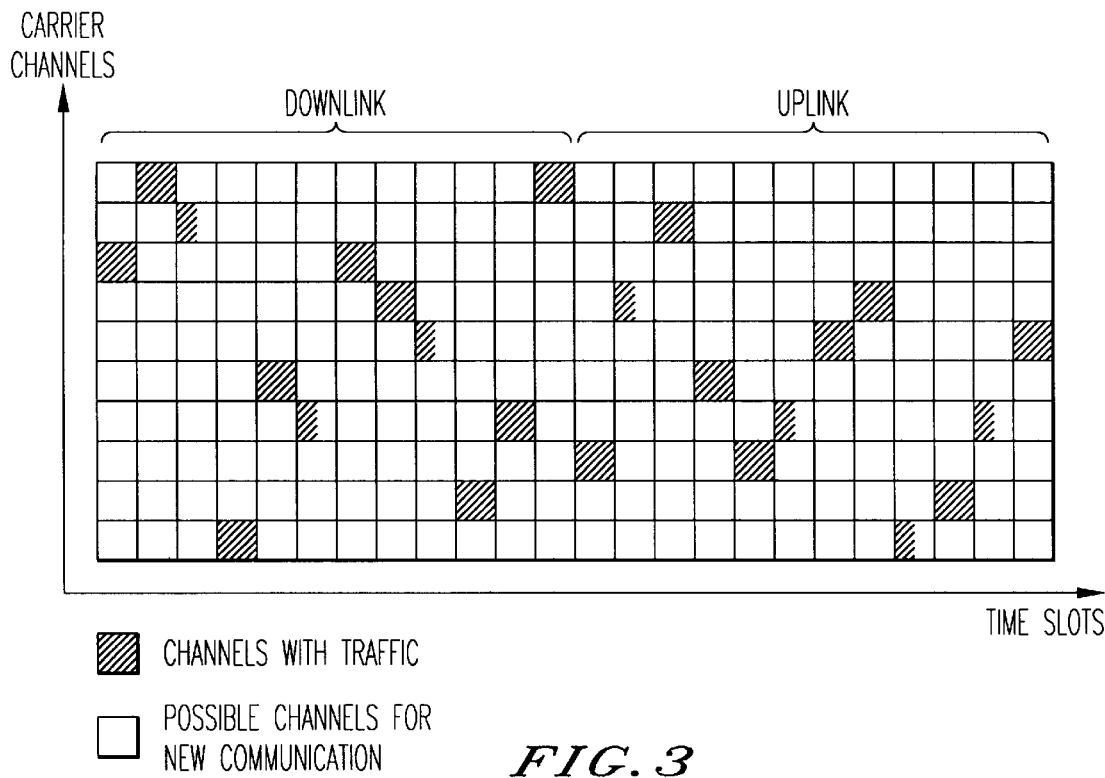
FIG. 3 shows superimposed signalling with using whole and half time slots.

It is possible to increase the signalling possibilities further:

a) use "halfslot" (is defined in the DECT-standard), which gives possibility to separate different messages from each other (one class of messages only uses halfslots for instance) or can be used to increase the "word length" (or the number possible) in the message. In FIG. 3 is described how ordinary slots are combined with halfslots. In this case there are consequently three different possibilities in a time and carrier slot (a specific square in the diagram in FIG. 3); empty, full or half.

For each time slot (a specific column of squares in the diagram) this gives 20 different possibilities. For a frame this consequently gives $20^{12}$ or $20^{24}$ different possibilities (only up and down link, respective both up and down link).

b) With more than one transceiver per "party" the number of possible messages (and the word length in these) are dramatically increased: with two transceivers per equipment the number of combinations is $90^{12}$ when either up or down link is used, and $90^{24}$ when both up and down links are used.

Figure 4:
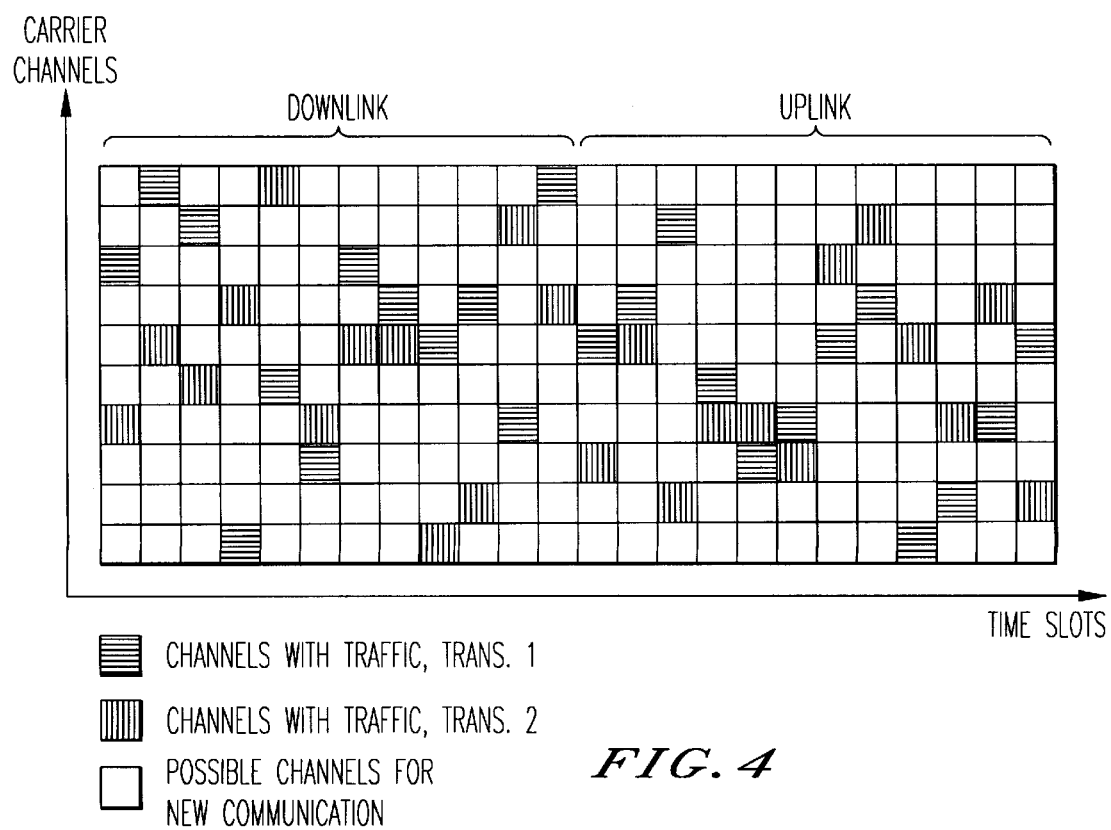
FIG. 4 shows superimposed signalling with using two transceivers simultaneously.

In a specific time slot (i.e. column in the diagram in FIG. 4) there are 10 different possibilities for the "first" transceiver, and 9 different possibilities for the second, totally 90 different possibilities per time slot. (The transceivers cannot send on the same frequency at the same time, for the superimposed signal as such this should be no problem, but it is not allowed according to the DECT-standard, and it would also be pointless).

The combination of a) and b) above is of course possible, and especially interesting in the case when only the base stations in the DECT-system have more than one transceiver; quite different messages can be sent out simultaneously without influencing each other.

As a conclusion can be established that the present invention gives possibility to via "normal" DECT-structure transfer many independent comparatively long messages without the capacity being influenced or the need for using or analyzing the contents in any time slot.

The DECT-standard is so designed that, for duplex communication, it is the portables that select what base station, carrier frequency and time slot shall be used. However, the base stations shall approve of the portable's channel choice. On other hand, for simplex communication, the base station can both select and approve of channel.

This entails that a base station (Fixed Part) can allocate time slots, which in its turn implies that the here suggested method of signalling in principle can be used by a base station according to present standard. Performance for superimposed signalling probably will increase if the base stations are given possibility to select channel straightly also for duplex communication. It is, however, probable that some kind of changing of the standard is coming, among other things justified by the introduction and standardization of repeaters which must be able to prove their identity to the base station in question.

Detecting of superimposed signalling is performed according to the following:

For systems where each transceiver can only listen in to one channel per time slot (for instance DECT), the invention comprises the following additions which make possible detecting of superimposed signalling:

A message shall be repeated during as many consecutive frames as the number of carriers which are needed to create the message. The receiver listens in to one and the same carrier during a time frame. At the next frame the next carrier is listened in to. This is repeated until all carriers have been listen in to.

For DECT this implies that a message has to be sent continuously during 10 frames, i.e. 100 ms. Further the receiving transceiver must listen in to the carriers in a cyclic way as above. Cyclic listening is defined in the DECT-standard and is called "primary scan". The principle is consequently possible to realise within the present DEC-standard.

For system (for instance DECT) where the transmitter of a message knows which cycle of listening the receiver is using, the whole message need not be repeated during each frame. It is sufficent to send that part of the message which is created on the carrier which is listened in to for the moment. In this way the amount of signalling is decreased.

The invention is not confined to the in the example above shown embodiment but may be subject to modifications within the frame of the following patent claims and the invention idea.

We claim:

1. A communication device in a telecommunication system, comprising:
   a short-message signaling mechanism configured to send a short message superimposed on an existing Digital European Cordless Telecommunications, DECT, signal without having allocated thereto a dedicated time slot or extra frequency space for the short message, said short-message signaling mechanism including a TDMA/TDD/MC-signaling mechanism configured to convey the short message in a pattern of time slots superimposed on the DECT signal.

2. The device of claim 1, wherein:
said short message being a short string of characters configured to identify at least one of a base station, a repeater, and a radio based network element that receives the short message, but not including a digital signal processing mechanism to decipher a contents of any time slot in the pattern of time slots in order to receive the short message.

3. The device of claim 2, wherein:
each time slot includes at least one of speech, data, and nonusable information.

4. The device according to claim 3, wherein:
at least one of the time slots being a half slot.

5. The device according to claim 4, wherein:
each pattern of time slots being an arrangement of particular time slots associated with different short messages, such that each pattern corresponds with a particular short message.

6. The device according to claim 1, wherein:
said short-signaling mechanism includes more than one transmitter configured to transmit on different frequencies while operating at a same time.

7. The device according to claim 1, wherein:
said DECT signal being configured to convey a long message without adversely affecting a capacity of the telecommunication system when the short-message is transmitted.

8. The device according to claim 1, wherein:
said short-signaling mechanism being hosted in a mobile unit configured to select one of a base station, a carrier frequency and particular time slots to be used for said short message, but subject to approval of the base station.

9. The device according to claim 8, wherein:
in a simplex communication mode of operation, the base station selects and approves the carrier frequency and particular time slot to be used by the mobile unit.

10. The device according to claim 9, wherein:
the base station allocates time slots using the short message.

11. The device according to claim 1, comprising:
a transmitter that hosts the short-message signaling mechanism and is configured to transmit said short message to a receiver that listens to only one channel per time slot such that in order to detect an entirety of the short message, according to the pattern, the short message is repeated by the transmitter on as many consecutive frames as a number of carriers demanded in order to create the short message such that the transmitter listens to only one carrier during a particular frame, and then a next carrier at a next frame until all frames have been listened to.

12. The device according to claim 11, wherein:
the short message being sent out continuously over a predetermined number of frames such that the transmitter listens to the predetermined frames cylically, one carrier per frame.

13. The device according to claim 11, wherein:

the transmitter is configured not to repeat the entire short message during each frame by knowing which listening cycle a receiver uses for a particular time frame.

14. The device according to claim 1, wherein:

said short-message signaling mechanism being configured to be included in a repeater such that communications with the repeater does not adversely affect a communication capacity of the system.

15. The device according to claim 1, further comprising:

a receiver configured to receive a predetermined number of carriers in respective time slots so as to avoid decoding information contained in respective time slots.

* * * * *